United States Patent
Taylor et al.

(10) Patent No.: US 11,229,071 B2
(45) Date of Patent: Jan. 18, 2022

(54) WIRELESS COMMUNICATION BETWEEN A TOOL AND A CONTROLLER

(71) Applicant: INGERSOLL-RAND INDUSTRIAL U.S., INC., Davidson, NC (US)

(72) Inventors: Christopher J. Taylor, Annandale, NJ (US); Madhusudhana Rao, Bangalore (IN); Vijaya Kumar K S, Tamilnadu (IN); Javeed Shariff, Bangalore (IN)

(73) Assignee: INGERSOLL-RAND INDUSTRIAL U.S., INC., Davidson, NC (US)

(*) Notice: Subject to any disclaimer, the term of this patent is extended or adjusted under 35 U.S.C. 154(b) by 123 days.

(21) Appl. No.: 16/552,205

(22) Filed: Aug. 27, 2019

(65) Prior Publication Data

US 2021/0022194 A1    Jan. 21, 2021

(30) Foreign Application Priority Data

Jul. 15, 2019   (IN) .............................. 201911028453

(51) Int. Cl.
*H04W 76/14*    (2018.01)
*H04L 29/08*    (2006.01)

(52) U.S. Cl.
CPC .............. *H04W 76/14* (2018.02); *H04L 67/34* (2013.01)

(58) Field of Classification Search
CPC ... H04L 67/34; H04L 63/0428; H04L 63/061; H04W 76/14; H04W 12/04; H04W 12/50; H04W 4/80; H04W 84/18; H04W 12/06; H04W 12/63; H04W 4/70; H04W 12/02; H04W 24/08; H04W 28/021; H04W 48/10; H04W 48/18; H04W 52/16; H04W 52/283; H04W 52/50; H04W 84/20
See application file for complete search history.

(56) References Cited

U.S. PATENT DOCUMENTS

| | | | |
|---|---|---|---|
| 9,204,243 B2 * | 12/2015 | Smart | H04W 4/80 |
| 9,504,388 B2 | 11/2016 | Baker et al. | |
| 9,706,015 B2 * | 7/2017 | Chazot | H04L 69/18 |
| 9,888,300 B2 | 2/2018 | Stampfl et al. | |
| 9,973,883 B2 | 5/2018 | Baker et al. | |
| 10,887,165 B2 * | 1/2021 | Sa | H04L 41/0816 |
| 2013/0171939 A1 | 7/2013 | Tian et al. | |
| 2014/0274033 A1 * | 9/2014 | Smart | H04W 52/028 455/426.1 |
| 2015/0365823 A1 | 12/2015 | Evennou et al. | |
| 2016/0127516 A1 * | 5/2016 | Chazot | H04L 69/18 710/11 |
| 2017/0174374 A1 | 6/2017 | Figiel et al. | |
| 2017/0303073 A1 | 10/2017 | Dobyns | |
| 2017/0351630 A1 * | 12/2017 | Li | H04L 43/0811 |
| 2018/0329441 A1 * | 11/2018 | Knight | G08C 17/02 |
| 2020/0006988 A1 * | 1/2020 | Leabman | A61B 8/56 |
| 2020/0377167 A1 * | 12/2020 | Suzuki | B60W 10/22 |

* cited by examiner

*Primary Examiner* — Phuc H Tran
(74) *Attorney, Agent, or Firm* — Kevin E. West; Advent, LLP

(57) ABSTRACT

A communication method is provided for communicating data between a tool and a controller. The method includes establishing communication between the tool and the controller using a first wireless communication protocol. Once wireless communication has been established, the tool and the controller switch to a new wireless communication protocol that is different from the first protocol. Operational settings are then wirelessly communicated by the controller to the tool using the second protocol.

20 Claims, 2 Drawing Sheets

WIRELESS COMMUNICATION BETWEEN A TOOL AND A CONTROLLER

BACKGROUND

The present inventions relate generally to tools that are used to perform physical tasks, and more particularly, to a method of communication between the tool and a controller.

A variety of tools may be used by manufacturers to produce products. One example of a type of industrial tool that is used in many factory assembly operations is a torque wrench or electric screwdriver. However, many other types of industrial tools are also used in factories, such as riveters, hammers, grinders, etc. Where precision is required for a particular tool and task, a tool may communicate with a controller to exchange data between the controller and the tool. This allows the performance of the tool to be closely controlled and monitored in a factory supervisory system.

Current communication systems for industrial tools and associated controllers may require the tool to be connected to a PC via a USB connection for pairing and the same PC application connected to the controller via Ethernet to facilitate the common settings. There are several problems with the current approach. For example, the process is manual and thus invites human error. The requirement for a third programming item to be manually connected is awkward and time wasting. PC applications are also difficult to maintain and in recent years customer IT departments are increasingly reluctant to support the installation of third party PC applications.

Another common approach is to use a cabled connection between the controller and the tool to communicate settings. Quite often, the controllers are hung out of easy reach, making the connection of a cable problematic. In certain plants, only certified electricians are authorized to connect or disconnect any cables causing more difficulties for the user in terms of time and complexity.

Wireless communication between a tool and a controller offers a number of advantages. Often a tool may need to be moved throughout the assembly space to access a variety of locations to perform physical tasks. This could be more difficult if a wired connection is required between the tool and the controller. It may also be desirable for the controller to be located remotely from the tool so that physical access to the controller may not be convenient. Therefore, where the controller is hanging in the factory out of reach from an operator, wireless communication would allow the user to connect to the controller without a ladder or certified electrician. The user could then perform the operation alone, without the aid of others or special equipment.

Thus, a wireless method to establish a communication connection and exchange data between the tool and the controller would be desirable.

SUMMARY

A communication method is described for establishing wireless communication between a tool and a controller. The method includes initiating pairing between the tool and the controller using an agreed wireless protocol. Communication is established by wirelessly transmitting and receiving a request and a response between the tool and the controller using the initial wireless protocol. After communication has been established between the tool and the controller, the tool and the controller both switch to a new wireless communication protocol for communication therebetween. Operational settings are then wirelessly communicated to the tool from the controller using the new wireless communication protocol.

BRIEF DESCRIPTION OF SEVERAL VIEWS OF THE DRAWINGS

The invention may be more fully understood by reading the following description in conjunction with the drawings, in which.

DETAILED DESCRIPTION

It would be desirable to have an automated process that is convenient and reduces the possibility of human error. In order to have an automated process with no PC application, the following would be a preferred approach. The user configures the controller with communication settings and operational settings desired. This may be accomplished through a web interface or UI on the controller. Once the controller is configured it is put into a pairing mode to find a target tool. The target tool is then put into a pairing mode by an intentional action on the tool, in the preferred embodiment, a predefined set of key presses. Once both are in the pairing mode, the controller may send the communication settings and both devices register with each other. Communications then occur point to point between the two devices using the desired communication settings.

Industrial tools may utilize a wireless radio for communication with a controller, such as a fastening controller. The controller and tool need to be configured with the same communication settings to establish point to point communications. Precision fastening tools may communicate with a fastening controller using the IEEE 802.15.4 radio specification and a custom protocol. As per the specification, the radios must be configured for the same channel and PAN ID for point to point communications.

In order for pairing and registration to occur the tool and controller must be temporarily set to an agreed upon channel and PAN ID (or first communication protocol). For the controller, a selection on a web interface may allow the controller to be put into pairing mode which sets the radio to the agreed upon settings. For the tool, holding two buttons down simultaneously for three seconds may put the tool into pairing mode. When in pairing mode, the controller may broadcast the user set communications settings (or request). On receipt, the tool may register the address of the controller, send an acknowledgement (or response), and change its radio settings to the received communications settings (or second communication protocol). Messages may only be accepted thereafter from the controller with the specified address and communication settings. The controller, on receipt of the acknowledgement, may register the address of the tool and change its radio settings to the user set communications settings. Messages may only be accepted thereafter from the tool with the specified address and communications settings.

Figure 1:
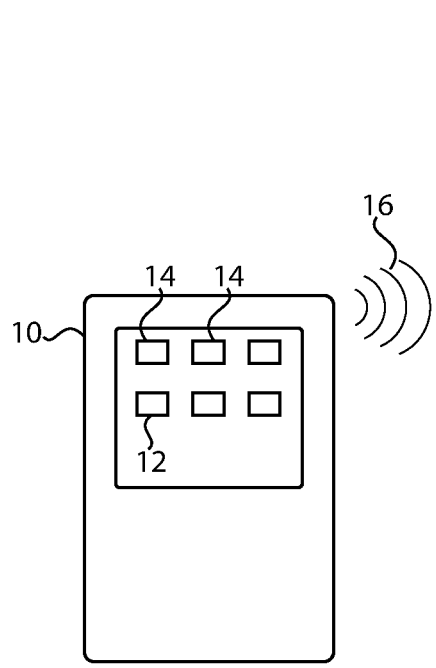
FIG. 1 is a schematic view of a controller.

An example of a controller 10 is shown in FIG. 1. The controller 10 may take many forms and may have a user interface 12 that is located remotely from the actual controller 10 if desired. For example, a computer tablet could be used as an interface between the user and the controller 10.

The user interface 12 may then communicate through a wired or wireless connection with the controller 10. The user interface 12 of the controller 10 may include icons 14 that may be selected by the user to perform various functions. One function that may be selected by pressing an icon is the pairing mode for the controller 10. The controller 10 also has a wireless radio 16 for communication with an industrial tool 20 using first and second communication protocols.

Figure 2A:
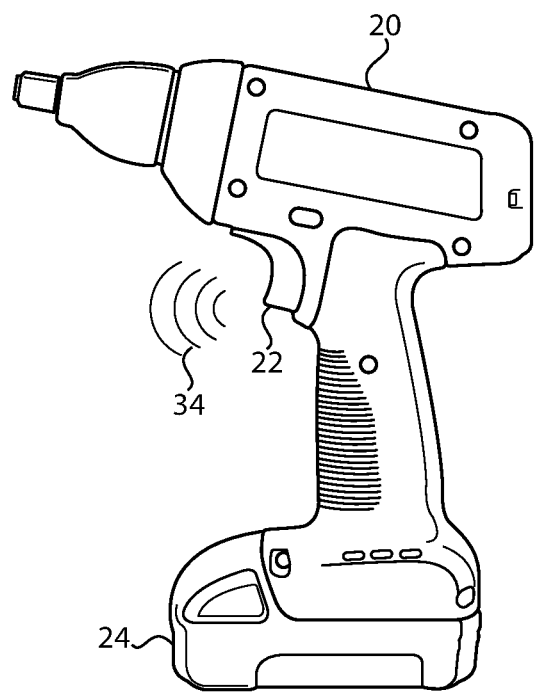
FIG. 2A is a side view of a tool.
Figure 2B:
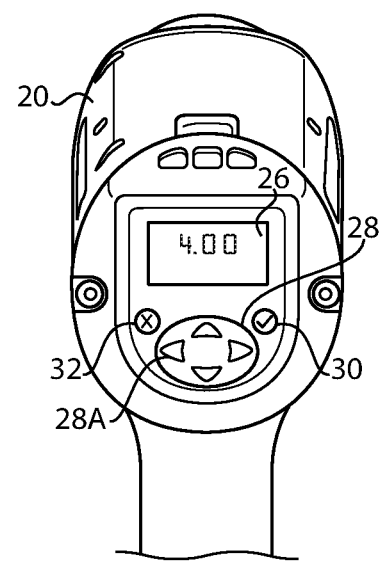
FIG. 2B is a rear view of the tool.

An example of an industrial tool 20 is shown in FIGS. 2A-2B. The tool 20 may be a cordless torque wrench or screwdriver 20. Thus, the tool 20 has an electric motor therein which is turned on and off by an operator engageable switch 22. A battery 24 is also provided to power the tool 20 including the electric motor. Preferably, the tool 20 includes a torque control system that is able to electronically control the output torque of the electric motor. The tool 20 also preferably has onboard memory for storing operational settings (e.g., tool settings and jobs). As described below, the operational settings may be wirelessly communicated from the controller 10 to the tool 20. The operational settings may be used by the torque control system to control or monitor the electric motor. As shown in FIG. 2B, the tool 20 may also have a display 26 for viewing various settings of the tool 20. Navigation buttons 28 may be provided for accessing the electronic menu system of the tool 20. An ok button 30 and a cancel button 32 may also be provided for control of the menus. Like the controller 10, the tool 20 has a wireless radio 34 for communication with the controller 10 using first and second communication protocols.

It is preferred for a long term energy scan to be performed prior to pairing to determine which channel is quietest. The initial pairing parameters (i.e., second communication protocol) for the controller/tool may be channel 15, power level 2, PAN ID being the last 2 bytes of the controller radio MAC address. The user can adjust these as needed based on the results of the long term energy scan. The user must put the controller into pairing mode (e.g., by pressing on icon on the controller). The screen may let the user know that the controller is in pairing mode. The user must then put the tool in pairing mode. This may be accomplished by holding down the ok and left navigation buttons 30, 28A at the same time for two seconds. It is preferable for two buttons to be required to initiate the pairing mode to prevent unintended pairing mode initiations since in an industrial setting it is quite likely for operators to inadvertently bump the buttons. Since the cancel button 32 may be used to cancel pairing between the controller and tool, it is preferred that the cancel button not be used as one of the two buttons for pairing initiation. The display screen may then alternate between the splash screen and the inverse splash screen once per second to indicate that the tool is in pairing mode. For wireless tools with no display, pairing may be accomplished via a USB connection. During pairing, the controller and tool may be on channel 25 with power level 0 and PAN ID 0xbeef (i.e., first communication protocol). Once pairing is initiated at the controller, the controller may then send out a pairing request broadcast message. Preferably, the pairing parameters (i.e., second communication protocol) are contained within the pairing request broadcast message. The tool may then respond to the request with an acknowledgement that the broadcast message has been received including the pairing parameters. On acknowledgment from the tool, the tool and controller may change to the updated pairing settings. That is, the tool changes to the updated pairing settings upon receiving the broadcast message and acknowledging receipt thereof, and the controller changes to the updated pairing settings upon receiving the acknowledgement from the tool. The controller then requests data from the tool with the updated pairing parameters. This data may include all permanent data needed by the controller that cannot be changed on the tool. This may include the tool max torque, tool max speed, factory TR (transducer range), the tool serial number, and the tool radio MAC address. The controller may then use the data to validate general settings and tool settings to ensure that the general settings and tool settings are consistent with the permanent data of the tool. That is, the controller ensures that proposed settings to be downloaded to the tool from the controller are suitable for the tool before downloading the settings to the tool. The controller may then download the general settings and tool settings to the tool and may notify the user that the pairing was successful. The tool LEDs may flash and then the tool may return to normal operation. If the user presses the cancel button on the tool, then the pairing mode may be canceled and the tool return to normal operation.

Because some behaviors of the tool are defined whether the tool is paired or not, an option may be available for the user to unpair a tool to allow that tool to run in a standalone manner.

Once paired, the tool may allow settings changes (any settings other than firmware update) only through the wireless connection by the controller. That is, it is preferable for the operator to be unable to change any settings directly on the tool while the controller and tool are paired. In other words, any settings changes must be made on the controller, which then wirelessly transmits the settings changes to the tool. Firmware updates may be done only through a USB connection. For any tool that is not paired, the tool may allow the USB connection to make changes to the tool settings. When paired, settings from the keypad of the tool may be disabled. That is, the keypad may be used by the operator to view the settings of the tool, but the keypad on the tool cannot be used to make changes to the settings when the controller and tool are paired. During pairing, the tool may be in a locked state. The tool may unlock after all settings, including tool settings, are downloaded to the tool and the expected state of the tool is unlocked. This may depend on any interlocks that have been enabled.

Conventional PCMs (Process Control Module) may use tool memory reads to extract data from the tool. This requires several messages to be exchanged between the tool and the PCM in order to retrieve a small set of data. That is, the PCM must read a large portion of memory from the tool in order to locate the relevant data needed by the PCM. By contrast, in the improved communication method, the tool responds to a request by the controller with the specific data required by the controller without the controller needing to directly read through and locate data from the tool. This makes the pairing process much faster than conventional methods.

During the handshaking process, the tool should be disabled so that the tool can only be used with operational settings provided to the tool by the controller. The controller may utilize a single request message for data. The tool may respond with data needed by the controller. This may include the current state of the tool as well data required by the controller to generate the enhanced EOR (End Of Run).

It is preferable for there to be no controller mode or tool mode settings. That is, when a tool is paired to the controller, the controller becomes the master of all data. If any change is made to the tool settings outside the control of the controller, then the controller may overwrite those changes when the tool reconnects with the controller. This is required to maintain the integrity of audit log. In the case of pairing a tool, any configurations on the tool may be deleted and replaced with any valid tool settings programmed and assigned by the controller for that tool.

Any number of tool settings can be programmed by the user and stored on the controller. A tool setting is a parameter setting that includes data that the tool uses to perform a physical task. An example of a tool setting is the torque setting for a particular bolt. However, up to 32 tool settings can be assigned to a tool at a time. Tool settings residing on tools connected via USB are not considered as assigned. Only tool settings residing on a paired wireless tool may be considered as assigned. For USB connected tools, the user may be able to load settings from the tool edit, and then send back. Parameter assignment for general settings and tool settings should also be available for USB connected tools.

Wireless tools preferably allow the use of jobs. A job is a sequence of tool settings that the tool uses to perform a defined group of physical tasks. For example, a job may include the torqueing of four different bolts, and thus, the job includes the tool settings (i.e., different torque settings) for each of the four bolts that will be torqued. Therefore, the jobs can utilize any combination of the 32 tool settings on the wireless tool. Batch count for each tool setting can vary per job. If there is more than one tool setting assigned to a job, the tool must be updated with the socket settings, batch count settings, and auto increment settings for each tool setting in the job whenever that job is selected. There may need to be some work done on the tool manager to make sure all checksums are kept in sync with the current settings sent to the tool. The auto increment settings allow the tool to manage the chaining of tool settings in the case where all cycles pass. If there are any fail rules, the tool may be configured to lock on a failure. The tool may remain locked until the controller notifies the tool what to do next. This may prevent the operator from being able to run the wrong tool setting after a failed cycle. It is expected that the controller may notify the tool of the next tool setting to run on a failure within 750 ms of the end of the failed cycle minimizing the downtime of the tool. If a job is created with tool settings that are not currently assigned to the tool, then the job may be considered invalid and the user may not be able to select this job. The downloading of tool settings at the time of job selection is undesirable as this can take considerable time and severely affect tact time. If the user wishes to use a job that has tool settings that are not currently assigned to the tool, then the user must assign those tool settings to the tool with the understanding that whatever tool settings had to be unassigned may make the jobs using those tool settings invalid.

Job selection can be one of the following: Internal (Controller), Internal (Tool), External MES (Manufacturing Execution System), External DIO Discrete, External DIO Binary, External Fieldbus Discrete, External Fieldbus Binary, or Barcode. When the setting is Internal (Tool), the configuration selection on the tool may be repurposed as a job selection. The job selection may be sent from the tool to the controller. The controller may then notify the tool which tool settings to select for the selected job. This only applies to tools paired with a controller. For all other tools the configuration selection on the tool may remain as a configuration selection. The general settings on the tool may have either internal or any as the configuration selection type. For all other job selection modes, the tool general settings may have the configuration selection mode as external.

Interlock is preferably enabled on the tool if batch counting and chaining may be handled by the MES/PLC. Smart socket may be enabled if socket interlock is enabled for the job. Socket I/O data must be configured in the tool setting. Changes in socket I/O may be communicated to the tool when they occur. Although a tool location ID may be changed and used as an identifier, decisions need not be made regarding this setting. Enable wireless retries should be enabled always and not displayed to the user as a setting.

The tool may report back only a portion of the data required by the system to be included in the cycle results. For cycles communicated to the controller over a wireless connection, the controller may append the missing data. This data includes the TR value. The TR values may be the user TR if this is not 0. If the user TR is 0 then the factory TR should be used. This enhanced EOR data may be saved to the cycle log and reported to any connected MES/PLC. Tools communicating via USB may not have any data appended. The EOR data from tools connected via USB may only be used for calibration.

The control manager in the corded system routes data from various sources to where the data needs to go. This adds a certain level of latency as well as complexity to the system. This level of indirection is undesirable. A subscription model for the tool manager allows for faster and more efficient access to data. The tool manager is a module for the controller and allows for a more efficient design to be considered.

The tool may ignore the loss of communications with the controller if the general settings for buffering feature is turned off.

If the tool is in a disabled state and loses connection with the controller, then the tool may stay in the disabled state until the connection is re-established with the controller and the controller notifies the tool that it should become enabled regardless of the buffering setting.

If the tool is in an enabled state and loses connection with the controller, then the tool may be able to run as long as there is room in the buffer that is configured in the general settings for the buffering feature when the feature is turned on. If the buffer size is set to 0, then the tool may become disabled immediately on detection of loss of connection with the controller. This is defined as either no acknowledgment for a message and all retries exhausted or the miss of three consecutive keep alive messages. While disconnected, the controller may maintain the desired state of the tool from any PLC/MES and may send the desired state to the tool on reconnection.

The tool display may change to indicate: Pairing, Disable on failed cycle, Handshaking, 32 tool settings, Update Batch Count, Auto Increment, Socket settings message, Paired tool job selection vs configuration selection, Tool locking (buffering+monitoring missed keep alives).

Figure 3:
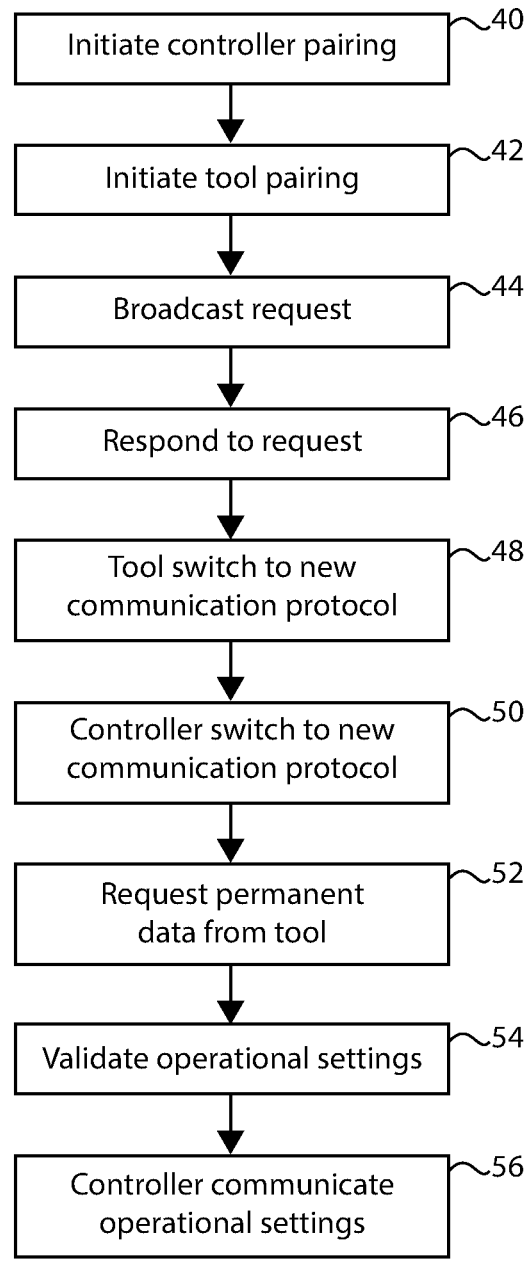
FIG. 3 is a flow chart of communication between the controller and the tool.

A flow chart of the method of communicating between the tool 20 and the controller 10 is shown in FIG. 3. In step 40, the controller 10 is placed in pairing mode by for example the operator selecting an icon 14 on the display screen 12 of the controller 10. When this occurs, the controller 10 switches to a first communication protocol. In step 42, the tool 20 is placed in pairing mode by for example the operator pressing two buttons 30, 28A on the tool 20. When this occurs, the tool 20 switches to a first communication protocol. Preferably, the parameters for the first communication protocol are previously stored in the controller 10 and the tool 20 so that upon initiating the pairing mode on the controller 10 and the tool 20 the two devices will be able to wirelessly communicate with each other. It is understood that steps 40 and 42 could occur in any order or at the same time. Once in the pairing mode, the controller 10 or the tool 20 wirelessly transmits a broadcast request in step 44 using the first communication protocol. Preferably, the request is broadcast by the controller 10. The request may include parameters of the second communication protocol. Thus, it is possible that a separate step of communicating the second communication protocol may not be necessary. The request is wirelessly received using the first communication protocol by the controller 10 or the tool 20 that did not send the request, which is preferably the tool 20.

In step 46, the tool 20 then wirelessly transmits an acknowledgement to the controller 10 in response to the wireless request using the first communication protocol. Once the tool 20 receives the request and/or responds to the request from the controller 10, the tool switches to the second communication protocol in step 48. Likewise, when the controller 10 wirelessly receives the response from the tool 20, the controller 10 also switches to the second communication protocol in step 50.

After the controller 10 and tool 20 have both switched to the second communication protocol, the controller requests permanent data (parameters) of the tool 20 in step 52, which the tool 20 sends to the controller 10 in response to the request. The controller may then use the permanent data in step 54 to validate the operational settings (e.g., tool settings and jobs) stored on the controller 10 to determine which operational settings are compatible with the tool 20. For example, if a tool setting stored on the controller 10 is outside the range of the tool 20, such tool setting would not be available to the tool 20. The controller 10 thus uses the validation to only wirelessly transmit operational settings to the tool 20 that are compatible therewith. In step 56, the controller 10 then wirelessly transmits operational settings using the second communication protocol to the tool 20 which wirelessly receives the operational settings using the second communication protocol.

Preferably, the first and second communication protocols comply with IEEE 802.15.4. Additionally, it is preferred for the controller 10 and the tool 20 to be able to wirelessly transmit and receive the request, response, operational settings, etc. at least 5 meters from each other using the first communication protocol and/or the second communication protocol, which allows the tool to be more effectively used in a large industrial assembly space without undue space constraints. The first and second communication protocols are preferably both defined by a channel, power level and PAN ID, where the channel, power level and/or PAN ID may be different in the first and second communication protocols. For the first communication protocol, it is preferable for the PAN ID to be a preset identifier that has been previously stored in the controller 10 and the tool 20. For the second communication protocol, the PAN ID may be a portion of the MAC address of the controller (or alternatively, of the tool).

Preferably, the controller 10 and the tool 20 maintain communication using the second communication protocol after the initial pairing so that the controller 10 can continue to transmit updated operational settings to the tool 20 while the tool 20 is used to perform physical tasks. Thus, even after the initial pairing and downloading of initial operational settings, the tool 20 may be used to perform physical tasks and thereafter the controller 10 can wirelessly transmit updated operational settings using the second communication protocol. Typically, the data for the tool settings will be significantly larger and more time consuming to wirelessly transmit and receive. Thus, it is preferable to initially download as many tool settings as the tool 20 can store in onboard memory and that are likely to be used in future jobs.

On the other hand, since jobs may include only a sequence listing of tool settings to be used, jobs may be significantly smaller and less time consuming to wirelessly transmit and receive. Thus, the tool 20 may be updated after initial pairing and after use in performing physical tasks by wirelessly receiving updated jobs which use tool settings already stored on the tool 20 so that the updates do not require new tool settings to be wirelessly transmitted and received after the initial pairing.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A method of transmitting operational settings from a controller to a power tool via a wireless communication between the power tool and the controller, comprising:

initiating a pairing mode on the controller in response to an input by an operator, the controller using a first communication protocol;

initiating the pairing mode on the power tool in response to an input by the operator, the power tool using the first communication protocol;

transmitting a request for establishing the wireless communication by a one of the controller or the power tool to the other of the controller or the power tool using the first communication protocol;

receiving the request for establishing the wireless communication by the other of the controller or the power tool using the first communication protocol;

transmitting a response to the request for establishing the wireless communication by the other of the controller or the power tool that received the request using the first communication protocol;

switching to a second communication protocol by the other of the controller or the power tool in response of the request to establish the wireless communication by the one of the controller or the power tool;

receiving the response to the request to establish the wireless communication by the one of the controller or the power tool that sent the request using the first communication protocol;

switching to the second communication protocol by the one of the controller or the power tool after receiving the response to establish a wireless communication by the other of the controller or the power tool;

transmitting operational settings by the controller to the power tool using the second communication protocol; and receiving the operational settings by the power tool from the controller using the second communication protocol.

2. The method according to claim 1, wherein the power tool comprises an electric motor, the operational settings being used by the power tool to control or monitor the electric motor.

3. The method according to claim 2, wherein the power tool comprises a button engageable by an operator to turn the electric motor on and off.

4. The method according to claim 2, wherein the operational settings comprise torque settings for the electric motor.

5. The method according to claim 1, wherein the pairing mode on the power tool is initiated by the operator by pressing two buttons on the power tool.

6. The method according to claim 1, wherein the request is wirelessly transmitted by the controller and is wirelessly received by the power tool, the power tool switching to the second communication protocol in response to wirelessly transmitting the response, and the controller switching to the second communication protocol in response to wirelessly receiving the response.

7. The method according to claim 1, wherein a first set of parameters defining the first communication protocol are stored on the controller and the power tool prior to initiating the pairing mode, and second set of parameters defining the second communication protocol are stored on the controller prior to initiating the pairing mode and are contained in the request wirelessly transmitted by the controller.

8. The method according to claim 1, wherein the first and second communication protocols comply with IEEE 802.15.4.

9. The method according to claim 1, wherein the controller and the power tool wirelessly transmit and receive the request at least 5 meters from each other using the first communication protocol.

10. The method according to claim 1, wherein the first communication protocol comprises a first channel and the second communication protocol comprises a second channel, the first and second channels being different from each other.

11. The method according to claim 1, wherein the first communication protocol comprises a first power level and the second communication protocol comprises a second power level, the first and second power levels being different from each other.

12. The method according to claim 1, wherein the first communication protocol comprises a first PAN ID and the second communication protocol comprises a second PAN ID, the first and second PAN IDs being different from each other.

13. The method according to claim 12, wherein the first PAN ID comprises a preset identifier stored in the controller and in the tool.

14. The method according to claim 12, wherein the second PAN ID comprises a portion of a MAC address of the one of the controller or the tool.

15. The method according to claim 1, wherein the power tool wirelessly transmits permanent tool parameters using the second communication protocol after switching to the second communication protocol, the controller wirelessly receiving the permanent tool parameters using the second communication protocol.

16. The method according to claim 15, wherein the permanent tool parameters include a tool max torque.

17. The method according to claim 15, wherein the controller validates the permanent tool parameters against stored operational settings and only wirelessly transmits the operational settings which are validated.

18. The method according to claim 1, wherein the controller and the power tool maintain communication using the second communication protocol while the power tool is used to perform physical tasks, the controller wirelessly transmitting and the power tool wirelessly receiving updated operational settings using the second communication protocol after the power tool has been used to perform physical tasks.

19. The method according to claim 1, wherein the operational settings include jobs and tool settings, each tool setting comprising data used by power the tool to perform a physical task and each job including a sequence of tool settings used by the power tool to perform a defined group of physical tasks.

20. The method according to claim 18, wherein the controller wirelessly transmits and the power tool wirelessly receives an updated job using the second communication protocol after the power tool is used to perform physical tasks, the updated job including a sequence of tool settings previously received by the power tool from the controller such that the updated job does not require wireless transmission and receiving of tool settings for the updated job.

* * * * *